United States Patent [19]
Hehr

[11] Patent Number: 6,068,024
[45] Date of Patent: May 30, 2000

[54] COMBINED FLUID INTAKE/DISCHARGE DEVICE AND SUPPORT MEANS FOR HYDRAULIC ROLLER

[76] Inventor: Kenneth Lee Hehr, 2395 Burk Rd., Blaine, Wash. 98230

[21] Appl. No.: 09/197,086

[22] Filed: Nov. 19, 1998

[51] Int. Cl.$^7$ .............. F16L 55/04; F16L 55/00; F16L 3/04; F16D 1/02
[52] U.S. Cl. ............... 138/106; 138/40; 138/42; 138/44
[58] Field of Search ................. 138/37, 40, 42, 138/44, 106

[56] References Cited

U.S. PATENT DOCUMENTS

| | | | |
|---|---|---|---|
| 2,217,216 | 10/1940 | Davis | 138/44 |
| 4,393,722 | 7/1983 | Scott | 138/45 |
| 5,069,252 | 12/1991 | Kendrick et al. | 138/44 |

*Primary Examiner*—Andres Kashnikow
*Assistant Examiner*—Davis Hwu

*Attorney, Agent, or Firm*—Graybeal Jackson Haley LLP

[57] ABSTRACT

A fluid delivery and removal mount for a stationary hydraulic roller shaft is disclosed as having a housing surrounding an annular support member which in turn supports the stationary roller shaft. The housing defines a pair of radially extending fluid conduits as does the annular support member. These fluid conduits in turn couple with a matched pair of radially oriented ports defined by the shaft. The shaft ports intersect a pair of axially extending fluid conduits formed in the shaft that serve to deliver and remove fluid from a hydraulic motor in roller. The annular support member preferably has a convex outer surface to match a concave inner surface of the housing thereby approximating the functionality of a self-aligning bearing. To facilitate off axis positions of the shaft, the fluid conduits of the housing are oversized compared to those of the annular support member. Optional circumferential seals located at the housing-support member interface limit fluid migration to the environment.

16 Claims, 2 Drawing Sheets

COMBINED FLUID INTAKE/DISCHARGE DEVICE AND SUPPORT MEANS FOR HYDRAULIC ROLLER

A FIELD OF THE INVENTION

This invention relates to hydraulically powered drive rollers for endless-belt conveyors wherein a hydraulic motor is totally enclosed within a rotatably supported drum or roller. More particularly this invention relates to fluid pressure supply and discharge arrangements for internally powered drive rollers as well as to support means for such rollers.

BACKGROUND OF THE INVENTION

It is known in the conveying arts to drive a load-carrying, endless belt or chain belt by disposing a hydraulic motor inside one of the end rollers which supports the belt and defines its path. This arrangement has obvious safety, compactness, simplicity and sanitation benefits. U.S. Pat. 4,013,166 Weady, is one example of this type of roller.

U.S. patent application Ser. No. 08/959,515, Hansson, is a highly refined and superior example of this technology and it is this type of hydraulic roller for which the present invention is intended. This roller is characterized by a stationary shaft disposed at one end of the roller drum, and one live shaft disposed at the opposite end of the drum. This design is advantageous over the prior art in that only one bearing assembly is required.

In the Hansson hydraulic roller, fluid is supplied to and removed from the internal hydraulic motor by way of parallel ducts machined the length of the stationary shaft that is an integral part of the end-port plate of the hydraulic motor. This arrangement greatly simplifies fluid piping requirements and consequently reduces the number of parts and hence overall cost. In keeping with the spirit of that invention, the present invention provides a simple, yet novel and unobvious fluid intake and discharge device to couple fluid into and out of the stationary shaft of the Hansson roller.

A prevalent feature of the Hansson roller lies in the ability to utilize existing, convention, self-aligning pillow-block or flange-block bearings to mount the roller to existing conveyor structures with only a small modification of the one bearing block intended for the stationary shaft. The present invention capitalizes on this feature by making this modified bearing block the means of fluid intake and discharge to the roller.

SUMMARY OF THE INVENTION

In light of these considerations, it is an object of the present invention to provide a fluid intake and discharge device for internally-powered hydraulic conveyor roller that is integrally formed with the roller support.

It is a second object of this invention to provide a combined fluid intake/discharge device and roller support means that is of simple, compact and rugged construction.

It is a third object of this invention to provide a fluid intake and discharge device that minimizes fittings and thus reduces manufacturing costs.

It is an additional object of this invention to provide a fluid intake and discharge device combined with a support means for a hydraulic roller that is easily assembled and removed with a minimum of tools.

These objects are achieved by the present invention, namely a support for a non-rotating fluid conduit. The support comprises a support for a non-rotating fluid conduit for use with a hydraulic roller comprising: a housing mountable to a stationary reference having an internal surface generally defining a cylindrical orifice and defining a fluid conduit to fluidly couple the orifice to the environment; a generally annular support member having an internal surface and an external surface wherein the external surface is sized to fit within the cylindrical orifice and wherein the support member defines a fluid conduit extending from the external surface to the internal surface to fluidly couple the housing fluid conduit to the orifice defined by the internal surface of the generally annular support; and a shaft having an external surface and defining a fluid conduit having an orifice at the external surface wherein at least a portion of the shaft is sized to fit within the generally annular support orifice and the fluid conduit aligns with the fluid conduit of the support member when the shaft is disposed therein whereby a fluid conduit is formed between the shaft fluid conduit and the environment.

In a preferred embodiment, the spherical bearing cartridge is removed from a conventional bearing block, the housing is slotted to allow ample clearance for the passage of fittings from opposed sides and a new support member containing the porting is installed in the housing. The intake and discharge fittings are threaded directly into the spherical member to communicate with integrally formed ports. This design thereby retains the self-aligning feature of the original bearing elements. The transfer of fluid across the boundary between the support member ports and the shaft ports relies on a close tolerance fit between the two. Any inconsequential leakage between these surfaces is retained by a pair of O-ring seals. Even with the close tolerance fit the modified bearing-block is rapidly assembled onto the stationary shaft by simply sliding the support member meets a shoulder. A flat key is then bolted into a slot milled at the end face of the shaft. The bearing housing is then bolted in place. This invention thus yields a robust, elegant, compact and economical roller support means combined with a fluid intake and discharge device for internally powered hydraulic rollers.

These and other features of the invention will become apparent upon inspection of the drawings and specification set forth herein.

DETAILED DESCRIPTION OF THE PREFERRED EMBODIMENT

Figure 2:
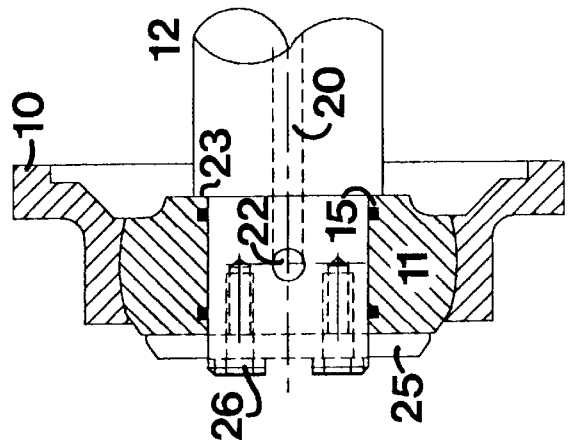
FIG. 2 is a longitudinal, vertical sectional view taken along the line 2—2 of FIG. 1.
Figure 1:
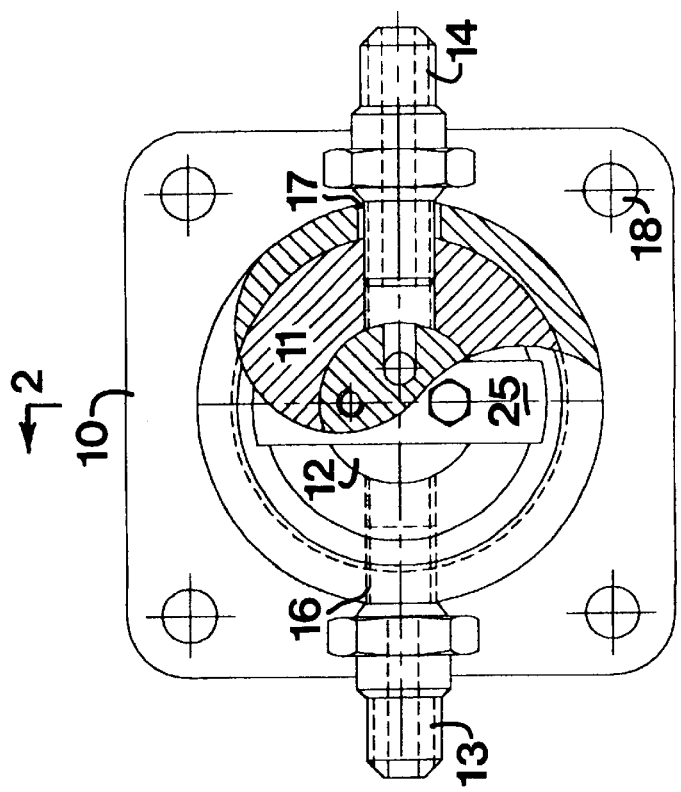
FIG. 1 is an end cut-away view of a preferred embodiment of the combined intake/discharge device and support means for a hydraulic roller.

Referring to FIGS. 1 and 2, a preferred embodiment of the combined fluid intake/discharge device and hydraulic roller support, is formed from a commercially available, four-bolt flange type, mounted bearing with a spherical self-aligning ball or roller bearing cartridge. The bearing cartridge is removed to leave housing 10 as the basis for the new device.

A generally annular support member 11, preferable of stainless steel, is machined to match the outside diameter of the old bearing cartridge. Support member 11 is bored for a close tolerance fit to shaft 12. Shaft 12 is the stationary shaft of a hydraulic internally powered roller. Support member 11 is drilled and tapped radially at two diametrically opposed points to receive intake fittings 13 and discharge fitting 14. These fittings are commercially available hydraulic bulkhead fittings. Alternative fitting arrangements are clearly within the scope of the invention. Support member 11 is then internally grooved for two O-rings 15. Prior to assembly of support member 11 into housing 10, the housing is drilled and slotted at two diametrically opposed points at 16 and 17 in the horizontal plane to allow the support member to remain self-aligning in case the conveyor frame on which housing 10 is to be mounted is not absolutely square. Housing 10 is secured to the conveyor frame by bolts (not shown) at four points 18.

Figure 3:
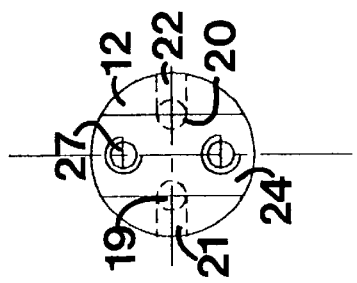
FIG. 3 is an end view of the stationary shaft of the hydraulic roller.

Referring to FIG. 3, shaft 12 has two parallel axial ducts 19 and 20 to convey fluid into and out of the hydraulic roller. Radial ducts 21 and 22 intersect with the respective axial ducts 19 and 20. Shaft 12 is provided with a shoulder 23 to act as a stop for support member 11 and is milled on its end face at 24 to receive a key 25. Key 25 is secured by two bolts 26 into drilled and tapped holes 27. In this manner support member 11 is secured tightly between shoulder 23 and key 25. Key 25 also acts to ensure the alignment of the intake fitting 13 and discharge fitting 14 with respective axial ducts 19 and 20.

Figure 5:
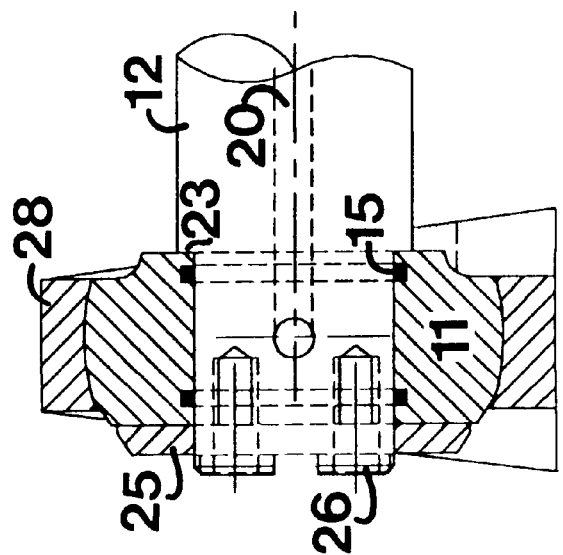
FIG. 5 is a longitudinal, vertical sectional view taken along the line 5—5 of FIG. 4.
Figure 4:
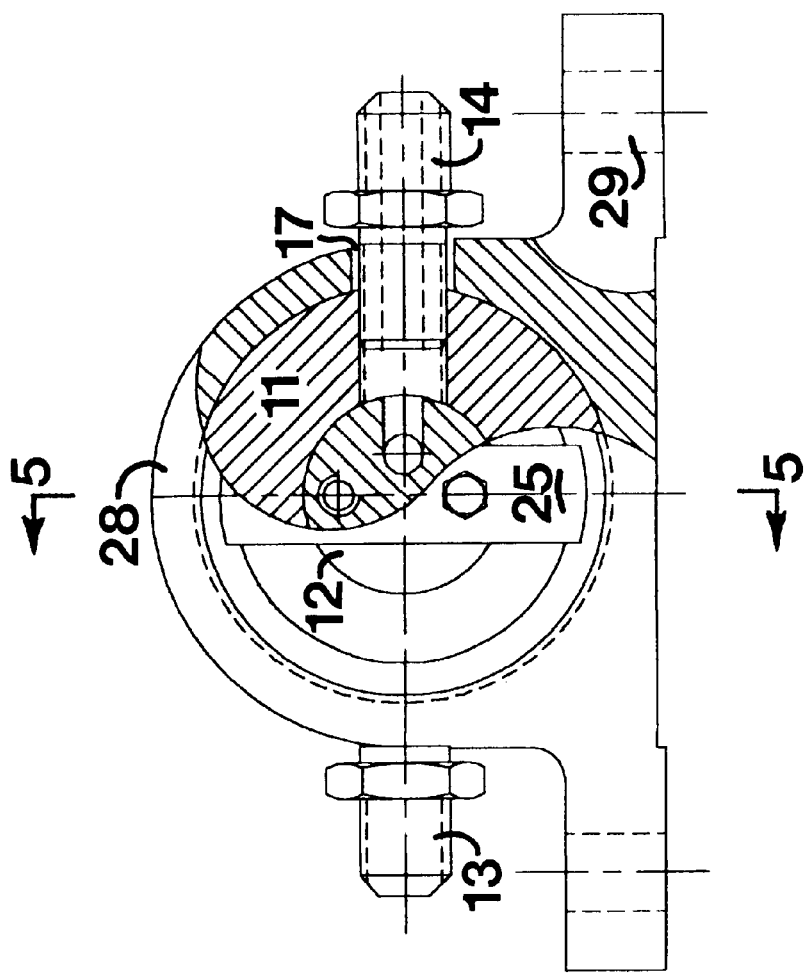
FIG. 4 is an end cut-away view of a second preferred embodiment of the invention.

Referring now to FIGS. 4 and 5, a second preferred embodiment of the combined fluid intake/discharge device and support means for a hydraulic roller is shown. In this arrangent housing 28 is the only difference over the first preferred embodiment. This second embodiment begins as a pillow-block mounted bearing in lieu of the four-bolt-flange mounted bearing of the first embodiment. Housing 28 is modified substantially the same as housing 10. All other components are identical to the first preferred embodiment. Housing 28 is secured to a conveyor frame by two bolts (not shown) at points 29.

It is clear from the above description that the present invention is also applicable to other styles of mounted bearings. Take-up mounted bearings, widely utilized in conveyor construction to allow easy belt removal and tensioning, can be modified to realize the present invention as can two-bolt-flange mounted bearings. In addition, it is also possible to engage fittings 13 and 14 with housing 10 or 28, provided that the support member to housing interface is sufficiently close to reduce unintended fluid migration.

The above description contains specifications for the purpose of illustration which should not be construed as limiting the scope of the invention. Numerous alternative embodiments and modifications are within the scope of the invention which should be determined by the appended claims and their legal equivalents.

What is claimed:

1. A support for a non-rotating fluid conduit for use with a hydraulic roller comprising:

a housing mountable to a stationary reference having an internal surface generally defining a cylindrical orifice and defining a fluid conduit to fluidly couple the orifice to the environment;

a generally annular support member having an internal surface and an external surface wherein the external surface is sized to fit within the cylindrical orifice and wherein the support member defines a fluid conduit extending from the external surface to the internal surface to fluidly couple the housing fluid conduit to the orifice defined by the internal surface of the generally annular support; and a shaft having an external surface and defining a fluid conduit having an orifice at the external surface wherein at least a portion of the shaft is sized to fit within the generally annular support orifice and the fluid conduit aligns with the fluid conduit of the support member when the shaft is disposed therein whereby a fluid conduit is formed between the shaft fluid conduit and the environment.

2. The support of claim 1 wherein the fluid conduits defined by the housing, the generally annular support member, and the shaft are generally aligned.

3. The support of claim 1 wherein the fluid conduits defined by the housing, the generally annular support member, and the shaft have a generally circular cross section and wherein the fluid conduit defined by the housing has a diameter greater than the fluid conduit defined by the generally annular support member.

4. The support of claim 1 wherein the external surface of the generally annular support member is radially convex and the internal surface of the housing is radially concave, thereby approximating a self-aligning bearing.

5. The support of claim 1 wherein the shaft further includes a shoulder to abut the generally annular support member on a first side and the support further comprises a key removably securable to the shaft to contact the generally annular support member on a second side opposite the first side whereby the shaft is held captive with the generally annular support member.

6. The support of claim 1 wherein the internal surface of the generally annular support member is grooved to receive at least one sealing member to prevent fluid flow at the interface between the generally annular support member internal surface and the shaft external surface.

7. The support of claim 1 wherein the housing defines a second fluid conduit to fluidly couple the housing orifice to the environment, the generally annular support member defines a second fluid conduit extending from the external surface to the internal surface to fluidly couple the second housing fluid conduit to the orifice defined by the internal surface of the generally annular support, and the shaft defines a second fluid conduit having an orifice at the external surface and the second shaft fluid conduit aligns with the second support member fluid conduit when the shaft is disposed therein.

8. The support of claim 7 wherein the fluid conduits defined by the housing, the generally annular support member, and the shaft have a generally circular cross section and wherein the fluid conduits defined by the housing have a diameter greater than the fluid conduits defined by the generally annular support member.

9. The support of claim 7 wherein the external surface of the generally annular support member is radially convex and the internal surface of the housing is radially concave, thereby approximating a self-aligning bearing.

10. The support of claim 7 wherein the shaft further includes a shoulder to abut the generally annular support member on a first side and the support further comprises a key removably securable to the shaft to contact the generally annular support member on a second side opposite the first side whereby the shaft is held captive with the generally annular support member.

11. The support of claim 7 wherein the internal surface of the generally annular support member is grooved to receive at least one sealing member to prevent fluid flow at the interface between the generally annular support member internal surface and the shaft external surface.

12. A support for a non-rotating fluid conduit for use with a hydraulic roller comprising:

housing mountable to a stationary reference having an internal surface generally defining a cylindrical orifice and defining a first and a second fluid conduit to fluidly couple the orifice to the environment;

a generally annular support member having an internal surface and an external surface wherein the external surface is sized to fit within the cylindrical orifice and wherein the support member defines a first and a second fluid conduit, each extending from the external surface to the internal surface to fluidly couple the housing first and second fluid conduits to the orifice defined by the internal surface of the generally annular support; and a shaft having an external surface defining a first and a second fluid conduit each having an orifice at the external surface wherein at least a portion of the shaft is sized to fit within the generally annular support orifice and the first fluid conduit aligns with the first fluid conduit of the support member and the second fluid conduit aligns with the second fluid conduit of the support member when the shaft is disposed therein whereby a pair of segmented fluid conduits are formed between the shaft fluid conduit and the environment.

13. The support of claim 12 wherein the first fluid conduits defined by the housing, the generally annular support member, and the shaft are substantially diametrically opposed to the second fluid conduits defined by the housing, the generally annular support member, and the shaft.

14. The support of claim 13 wherein the external surface of the generally annular support member is radially convex and the internal surface of the housing is radially concave, thereby approximating a self-aligning bearing.

15. The support of claim 14 wherein the shaft further includes a shoulder to abut the generally annular support member on a first side and the support further comprises a key removably securable to the shaft to contact the generally annular support member on a second side opposite the first side whereby the shaft is held captive with the generally annular support member.

16. The support of claim 15 wherein the internal surface of the generally annular support member is grooved to receive at least one sealing member to prevent fluid flow at the interface between the generally annular support member internal surface and the shaft external surface.

* * * * *